United States Patent
Ho et al.

(10) Patent No.: US 10,977,340 B2
(45) Date of Patent: Apr. 13, 2021

(54) DYNAMIC GRAYSCALE ADJUSTMENT METHOD AND RELATED DEVICE

(71) Applicant: ACER INCORPORATED, New Taipei (TW)

(72) Inventors: Andy Ho, New Taipei (TW); Tsung-Han Yang, New Taipei (TW); Szu-Chieh Wang, New Taipei (TW); Jian-Chi Lin, New Taipei (TW); Jason Hsiao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 416 days.

(21) Appl. No.: 15/997,667

(22) Filed: Jun. 4, 2018

(65) Prior Publication Data
US 2019/0050374 A1 Feb. 14, 2019

(30) Foreign Application Priority Data
Aug. 9, 2017 (TW) .................................. 106126873

(51) Int. Cl.
*G06F 17/18* (2006.01)
*G06F 17/17* (2006.01)
*G06K 9/38* (2006.01)

(52) U.S. Cl.
CPC .............. *G06F 17/18* (2013.01); *G06F 17/17* (2013.01); *G06K 9/38* (2013.01)

(58) Field of Classification Search
CPC ............ G06F 17/18; G06F 17/17; G06K 9/38
See application file for complete search history.

(56) References Cited

U.S. PATENT DOCUMENTS

| | | | | |
|---|---|---|---|---|
| 9,158,989 | B1* | 10/2015 | Stein | ................ G06T 5/002 |
| 2004/0153445 | A1* | 8/2004 | Horvitz | ............ G06F 16/148 |
| 2007/0101250 | A1 | 5/2007 | Sumpf | |
| 2013/0235070 | A1* | 9/2013 | Webb | ................. G06T 7/90 |
| | | | | 345/594 |
| 2015/0071541 | A1* | 3/2015 | Qutub | ................. G06T 7/11 |
| | | | | 382/173 |

FOREIGN PATENT DOCUMENTS

| TW | 201636924 A | 10/2016 |
|---|---|---|
| TW | 201721551 A | 6/2017 |

OTHER PUBLICATIONS

Medical Quality and Safety Forum, "Average and Standard Deviation Chart", "https://qi.cch.org.tw/zh-tw/zb/xbarS", p. 1-3, published on Dec. 2, 2015.
excel2earth, "2.2.1.1 Layered color map", http://excel2earth.blogspot.tw/2015/05/2221.html, Fig. 2, Quantile Map section, published on May 19, 2015.

* cited by examiner

*Primary Examiner* — Stephanie E Bloss
(74) *Attorney, Agent, or Firm* — Winston Hsu

(57) ABSTRACT

A dynamic scale adjustment method for data visualization enhancement comprises calculating statistical data for a data collection section according to data collected in the data collection section, calculating a mean value according to the statistical data corresponding to the data collection section, dividing the statistical data into a plurality of levels, determining an upper threshold and a lower threshold according to the mean value, and assigning a first data of the statistical data to the highest level when the first data exceeds the upper threshold and assigning a second data of the statistical data to the lowest level when the second data is under the lower threshold.

12 Claims, 3 Drawing Sheets

DYNAMIC GRAYSCALE ADJUSTMENT METHOD AND RELATED DEVICE

BACKGROUND OF THE INVENTION

1. Field of the Invention

The present disclosure relates to a method for data visualization and related device, and more particularly, to a dynamic scale adjustment method and related device.

2. Description of the Prior Art

In order to let users to quickly understand a large amount of information, news or related statistical software, graphic representation is often used for displaying the information to the users, so that the user can understand this information visually. In a word, a lot of information is conveyed by the use of graphical means to realize the purpose of data visualization. For example, the color change can be used for representing whether the data is higher than the reference value or lower than the reference value, and the degree of shade can be used for reflecting the difference between the data and the reference value, so the user can read the information easily.

For example, a heat map is suitable for interpreting the intensiveness of an environment in a time interval. However, when the heat map is used to represent data, if a color is defined by a fixed threshold, it may be difficult to read the data. For example, too many extreme data will make whole picture become overheated, whereas a few extreme data will not be able to present the overall situation. If 95% of the data are less than 10, but 5% of the data is greater than 2000, with the fixed threshold, it is impossible to show how high of the heat is since the data bigger than "10" (e.g. the data is indicated as "11"-"30") are all represented as red color. That is, even the data is indicated as "2000", which is also represented as red color, and thus the way of displaying information with fixed threshold cannot reflect the real situation.

Although the user can adjust the threshold to make the color in the heat map evenly distributed, the threshold in a certain time interval may result even distribution, but the same threshold in another time interval may be not. Therefore, the user needs to constantly adjust the threshold, so that the heat map can correctly show the relationship of the data. However, there is no specification to define how to adjust or calculate the threshold, and thus the user adjusts the threshold only with his feeling without any criteria.

SUMMARY OF THE INVENTION

It is therefore an objective to provide a dynamic scale adjustment method and data visualization processing device, to solve the above problems.

The present disclosure provides a dynamic scale adjustment method for data visualization enhancement. The dynamic scale adjustment method comprises calculating statistical data for a data collection section according to the data collected in the data collection section, calculating a mean according to the statistical data corresponding to the data collection section, dividing the statistical data into a plurality of levels, determining an upper threshold and a lower threshold according to the mean value, and assigning a first data of the statistical data to the highest level when the first data exceeds the upper threshold and assigning a second data of the statistical data to the lowest level when the second data is under the lower threshold.

The present disclosure further provides a data visualization processing device for dynamic scale adjustment. The data visualization processing device comprises a processing unit for processing a program code, a detecting unit for collecting data in every data collection section, a storage unit, coupled to the processing unit and the detecting unit, for storing the program code and the collected data, wherein the program code instructs the processing unit to execute the process: calculating statistical data for a data collection section according to the collected data, calculating a mean according to the statistical data corresponding to the data collection section, dividing the statistical data into a plurality of levels, determining an upper threshold and a lower threshold according to the mean value, and assigning a first data of the statistical data to the highest level when the first data exceeds the upper threshold and assigning a second data of the statistical data to the lowest level when the second data is under the lower threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
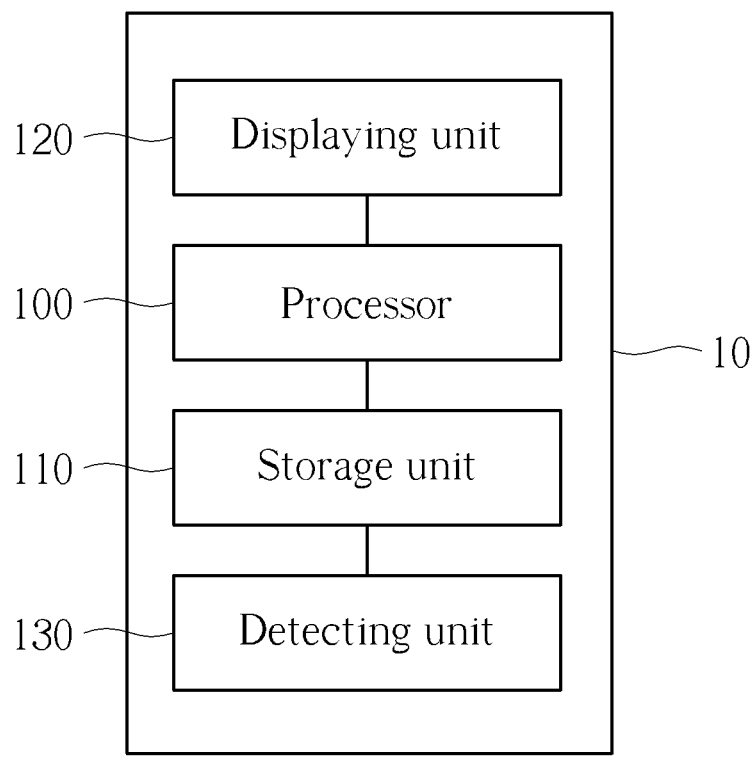
FIG. 1 is a schematic diagram of a data visualization processing device according to the present disclosure.

FIG. 1 is a schematic diagram of a data visualization processing device 10 according to the present disclosure. The data visualization processing device 10 could be a digital signage or a monitor, and includes a processor 100 such as Application Specific Integrated Circuit (ASIC), etc., a storage unit 110, a displaying unit 120 and a detecting unit 130. The storage unit 110 may be any data storage device that can store a processing result which is generated by the processor 100 Examples of the storage unit 110 include but are not limited to a read-only memory (ROM), flash memory, random-access memory (RAM), CD-ROMs, magnetic tape, hard disk, and optical data storage device. The displaying unit 120 is used for displaying the processing result of the processor 100 with graphic manner (i.e. a heat map and any statistical graphs). The detecting unit 130 is used for collecting data and storing the collected data in the storage unit 110 according to a background subtraction operation, a dynamic subtraction operation, or an object frame detection operation. In addition, the data to be collected could be a real-time image or an image frame, which is not limited herein.

Figure 2:
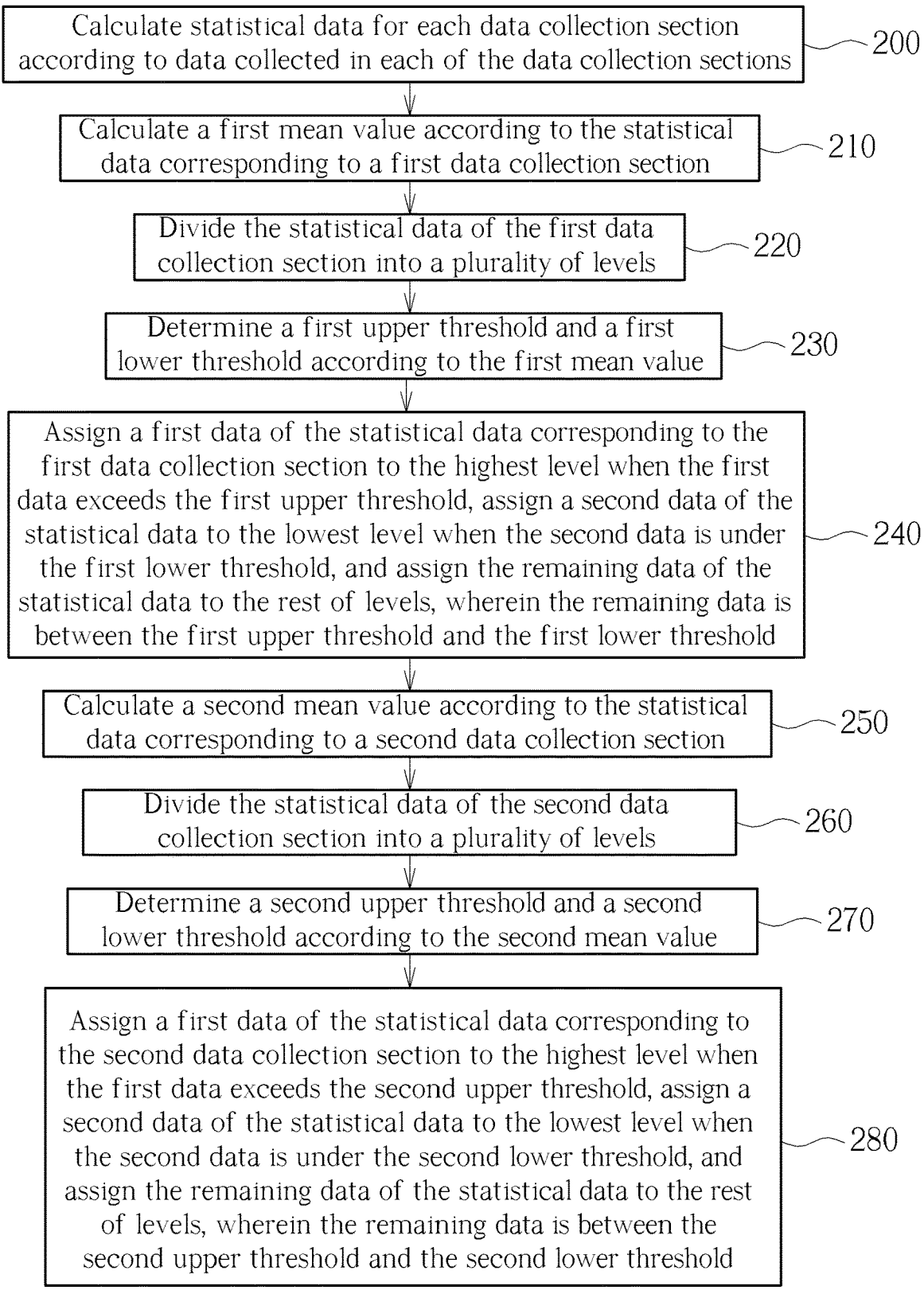
FIG. 2 is a flowchart of an exemplary process according to the present disclosure.

In addition, an operation of the data visualization processing device 10 is summarized into a dynamic scale adjustment process 20. Please refer to FIG. 2, which is a flowchart of the dynamic scale adjustment process 20 according to an example of the present disclosure. The dynamic scale adjustment process 20 may include the following steps:

Step 200: Calculate statistical data for each data collection section according to data collected in each of the data collection sections.

Step 210: Calculate a first mean value according to the statistical data corresponding to a first data collection section.

Step 220: Divide the statistical data of the first data collection section into a plurality of levels.

Step 230: Determine a first upper threshold and a first lower threshold according to the first mean value.

Step 240: Assign a first data of the statistical data corresponding to the first data collection section to the highest level when the first data exceeds the first upper threshold, assign a second data of the statistical data to the lowest level when the second data is under the first lower threshold, and assign the remaining data of the statistical data to the rest of levels, wherein the remaining data is between the first upper threshold and the first lower threshold.

Step 250: Calculate a second mean value according to the statistical data corresponding to a second data collection section.

Step 260: Divide the statistical data of the second data collection section into a plurality of levels Step 270: Determine a second upper threshold and a second lower threshold according to the second mean value.

Step 280: Assign a first data of the statistical data corresponding to the second data collection section to the highest level when the first data exceeds the second upper threshold, assign a second data of the statistical data to the lowest level when the second data is under the second lower threshold, and assign the remaining data of the statistical data to the rest of levels, wherein the remaining data is between the second upper threshold and the second lower threshold.

According to the dynamic scale adjustment process 20, the data visualization processing device 10 is able to dynamically adjust the threshold. In other words, each data collection section corresponds to a threshold. For example, the first data collection section and the second data collection section respectively correspond to the first upper and lower thresholds and the second upper and lower thresholds. Thus, data scale of each data collection section could be adjusted for a basis of data level distribution. In an embodiment, the data collection section is a time interval in which data is collected, and the data level is associated to color histogram, which is displayed by a heat map. However, in other embodiments, the data collection section could be a spatial interval, where data is collected in an area. In order for the user to quickly understand the data collected in the time interval, the heat map will show the relationship between the data in different colors, so the user can immediately identify the data level. The dynamic scale adjustment process 20 of the present invention can be used for dynamically adjusting the colors of the heat map, so that the data collected at different time intervals are displayed in appropriate colors, thereby enhancing the effect of data visualization.

Figures 3, 4:
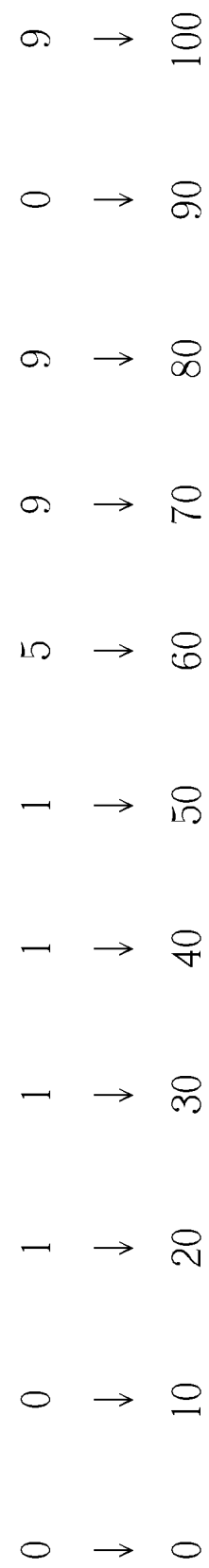
FIG. 3 is a schematic diagram of data statistical operation according to the present disclosure.
FIG. 4 is a schematic diagram of a data sorting operation according to the present disclosure.

Reference is made to FIG. 3, which is a schematic diagram of data statistical operation according to the present disclosure. The detecting unit 130 of the data visualization processing device 10 collects the image data X1-Xn within a time interval. The data collection method may apply with a background subtraction operation, a dynamic subtraction operation, or an object frame detection operation, but it is not limited herein. In FIG. 3, "0" indicates that the pixel value (e.g. gray scale value=0-255) does not change, and "1" indicates that the pixel value changes. Then, the processor 100 calculates the statistical data X according to the collected image data X1-Xn. In a word, the statistical data X includes parameters indicated as "0", "1", "5", and "9", which is the number of changes in the pixel values of each pixel and is obtained by adding the image data X1-Xn. The processor 100 calculates the mean value from the parameters. That is, the sum of all the parameters are divided by the number of parameters, so that the mean value is $45/9=5$. In this embodiment, the processor 100 uses twice the mean value as the upper threshold (e.g. the upper threshold is set as $2*5=10$), and takes the ½ times of the mean value as the lower threshold (e.g. the lower threshold is $5/2=2.5$).

Note that, the number of data levels or colors of a color palette can be determined by the user. For example, the user applies seven colors of the rainbow for data distribution. In an embodiment, the processor 100 scales the parameters exceeding the upper threshold back to the upper threshold (parameters exceeding the upper threshold means a superheat part of the heat map). That is, the parameters exceeding the upper threshold are assigned to the highest level. On the other hand, parameters lower than the lower threshold are considered to be insufficient heat. That is, all parameters lower than the lower threshold are assigned to the lowest level. For example, if the statistical data X includes parameter indicated as "11", the processor 100 will adjust the data to "9" or "10", such that the data will be assigned to the highest level. In addition, if the statistical data X includes parameter indicated as "0" or "1", the data will be adjusted to "2.5" or deleted, such that the data will be assigned to the lowest level. In a word, the processor 100 of the present invention can independently determine the upper and lower thresholds according to the mean value, for adjusting the scale of the data or the distribution of the data, so as to evenly assign colors to the data.

In one embodiment, the processor 100 deletes the data "0" and "1" below the lower threshold "2.5", and leaves "5" and "9", so that two colors are displayed in the heat map. In order to evenly display the color, the processor 100 may perform appropriate smoothing operation on the data, such as through a sigmoid function, so that the two colors are presented in gradient manner to avoid color jump. In other embodiments, the data "0" and "1" below the lower threshold "2.5" are assigned to the same level, so that three colors are displayed in the heat map, where the smoothing operation can be selectively performed.

Moreover, assuming that the user decides to use 10 colors to display the heat map, in order to make the 10 colors appear evenly, after the processor 100 calculates the mean value, the processor 100 sorts the data in descending order to determine whether the mean value is the median in sequence, for determining whether to perform a conversion operation to the data. Please refer to FIG. 4, which is a schematic diagram of a data sorting operation according to the present disclosure. The processor 100 orders the data "0", "1", "5", and "9", and then determines whether the mean value is the median in the sequence. In FIG. 4, the median falls on the 50th percentile is "1" (namely the median is "1"), while the mean value "5" falls on the 60th percentile (namely 40% of the data are above the average, and 60% of the data are below the average), which results uneven color distribution. In this case, the user can selectively perform the correction operation to convert the data into a more suitable scale, so that the converted data could be evenly distributed in colors. In a word, the user adjusts the mean value "5" to the 50th percentile, so that 10 colors can be evenly displayed.

The abovementioned steps of the processes/operations including suggested steps can be realized by means that could be a hardware, a software, or a firmware known as a combination of a hardware device and computer instructions and data that reside as read-only software on the hardware device or an electronic system. In an embodiment, the storage unit 110 of the data visualization processing device 10 stores storage data, which includes a program code compiled with the dynamic scale adjustment process 20, and executed by the processor 100 for realizing the steps of the dynamic scale adjustment process 20. In addition, examples of hardware can include analog, digital and mixed circuits known as microcircuit, microchip, or silicon chip. Examples of the electronic system can include a system on chip (SOC), system in package (SiP), a computer on module (COM) and the data visualization processing device 10.

In conclusion, the present invention provides a method and related device for dynamically adjusting data scale. In detail, the concept is addressed at scale adjustment and distribution, so as to avoid wide data distribution and evenly assign the data to a corresponding color of the color palette for even usage. As a result, the heat map is colorfully presented, so that the user can easily and quickly understand the changes of data, whereby the efficiency of information dissemination is improving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic grayscale adjustment method for data visualization enhancement, the method comprising:
    calculating statistical data for a data collection section according to data collected in the data collection section;
    calculating a mean value according to the statistical data corresponding to the data collection section;
    dividing the statistical data into a plurality of levels;
    determining an upper threshold and a lower threshold according to the mean value;
    assigning a first data of the statistical data to a highest level when the first data exceeds the upper threshold and assigning a second data of the statistical data to a lowest level when the second data is under the lower threshold;
    sorting the statistical data corresponding to the data collection section;
    determining a percentile position of the mean value in the sorted statistical data; and
    performing a correction operation on the statistical data when the mean value is not distributed in the middle of the percentile, whereby the mean value is aligned to the middle of the percentile.

2. The dynamic grayscale adjustment method of claim 1, wherein the step of assigning the first data of the statistical data to the highest level when the first data exceeds the upper threshold and assigning the second data of the statistical data to the lowest level when the second data is under the lower threshold comprises:
    assigning the first data of the statistical data to the upper threshold when the first data exceeds the upper threshold; and
    assigning the second data of the statistical data to the lower threshold or deleting the second data when the second data is under the lower threshold.

3. The dynamic grayscale adjustment method of claim 1, further comprising:
    performing a smoothing operation on the statistical data, whereby the statistical data is evenly distributed among the plurality of levels.

4. The dynamic grayscale adjustment method of claim 1, wherein the plurality of levels are associated to a color histogram.

5. The dynamic grayscale adjustment method of claim 1, wherein the upper threshold and the lower threshold are multiples of the mean value.

6. The dynamic grayscale adjustment method of claim 1, wherein the data collection section includes a time interval and a spatial interval.

7. A data visualization processing device for dynamic grayscale adjustment, the data visualization processing device comprising:
    a processor, for executing a program code; and
    and
    a storage unit, coupled to the processor, for storing the collected data and the program code;
    wherein the program code instructs the processor to execute the following steps:
    calculating statistical data for a data collection section according to collected data of the data collection section;
    calculating a mean value according to the statistical data corresponding to the data collection section;
    dividing the statistical data into a plurality of levels;
    determining an upper threshold and a lower threshold according to the mean value;
    assigning a first data of the statistical data to the highest level when the first data exceeds the upper threshold and assigning a second data of the statistical data to the lowest level when the second data is under the lower threshold;
    determining a percentile position of the mean value in the sorted statistical data; and
    performing a correction operation on the statistical data when the mean value is not distributed in the middle of the percentile, whereby the mean value is aligned to the middle of the percentile.

8. The data visualization processing device of claim 7, wherein the program code further instructs the processor to execute the following steps:
    assigning the first data of the statistical data to the upper threshold when the first data exceeds the upper threshold; and
    assigning the second data of the statistical data to the lower threshold or deleting the second data when the second data is under the lower threshold.

9. The data visualization processing device of claim 7, wherein the program code further instructs the processor to execute the following steps:
    performing a smoothing operation on the statistical data, whereby the statistical data is evenly distributed among the plurality of levels.

10. The data visualization processing device of claim 7, wherein the plurality of levels are associated to a color histogram.

11. The data visualization processing device of claim 7, wherein the upper threshold and the lower threshold are multiples of the mean value.

12. The data visualization processing device of claim 7, wherein the data collection section includes a time interval and a spatial interval.

* * * * *